US010298608B2

(12) United States Patent
Knapp et al.

(10) Patent No.: US 10,298,608 B2
(45) Date of Patent: May 21, 2019

(54) APPARATUS AND METHOD FOR TYING CYBER-SECURITY RISK ANALYSIS TO COMMON RISK METHODOLOGIES AND RISK LEVELS

(71) Applicant: Honeywell International Inc., Morris Plains, NJ (US)

(72) Inventors: Eric D. Knapp, Milton, NH (US); Sinclair Koelemij, Velsen-Zuid (NL)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/871,136

(22) Filed: Sep. 30, 2015

(65) Prior Publication Data

US 2016/0234239 A1    Aug. 11, 2016

Related U.S. Application Data

(60) Provisional application No. 62/114,937, filed on Feb. 11, 2015.

(51) Int. Cl.
*H04L 29/06* (2006.01)
*H04L 12/24* (2006.01)
*G06F 21/57* (2013.01)

(52) U.S. Cl.
CPC ........ *H04L 63/1433* (2013.01); *G06F 21/577* (2013.01); *H04L 41/06* (2013.01)

(58) Field of Classification Search
None
See application file for complete search history.

(56) References Cited

U.S. PATENT DOCUMENTS 6,266,773 B1    7/2001    Kisor et al.
6,338,149 B1 *  1/2002    Ciccone, Jr. .............. G06F 8/65
                                                         714/38.12
(Continued)

FOREIGN PATENT DOCUMENTS

JP    2008-112284       5/2008
KR    10-2005-0068052   7/2005
(Continued)

OTHER PUBLICATIONS

Symantec; "Symantec Control Compliance Suite 11.0 User Guide;" 2012; Retrieved from the Internet <URL: https://www.scribd.com/document/126556709/CCS-User-Guide>; pp. 1-952 as printed.*

(Continued)

*Primary Examiner* — Saleh Najjar
*Assistant Examiner* — Michael W Chao

(57) ABSTRACT

This disclosure provides systems and methods for tying cyber-security risk analysis to common risk methodologies and risk levels. A method includes identifying a plurality of connected devices that are vulnerable to cyber-security risks and identifying cyber-security risks in the connected devices. The method includes assigning a risk level to each of the risks and comparing the risk levels to a first threshold and to a second threshold. The method includes assigning each identified cyber-security risk to a risk classification and displaying a user interface that includes a notification according to the identified cyber-security risks and the corresponding assigned risk classifications.

19 Claims, 3 Drawing Sheets

(56) References Cited

U.S. PATENT DOCUMENTS

| | | | |
|---|---|---|---|
| 7,136,856 B2 | 11/2006 | Birbo et al. | |
| 7,152,105 B2 | 12/2006 | McClure et al. | |
| 7,415,503 B2 | 8/2008 | Chernoguzov | |
| 7,627,891 B2 | 12/2009 | Williams et al. | |
| 7,900,259 B2 | 3/2011 | Jeschke et al. | |
| 7,908,660 B2 | 3/2011 | Bahl | |
| 7,921,459 B2 | 4/2011 | Houston et al. | |
| 7,984,504 B2 | 7/2011 | Hernacki et al. | |
| 8,020,210 B2 | 9/2011 | Tippett et al. | |
| 8,087,087 B1 | 12/2011 | Oorschot et al. | |
| 8,141,155 B2 | 3/2012 | Jeschke et al. | |
| 8,280,833 B2* | 10/2012 | Miltonberger | G06Q 10/067 705/348 |
| 8,380,569 B2* | 2/2013 | Nightengale | G06Q 40/02 705/14.26 |
| 8,392,995 B2 | 3/2013 | Williamson et al. | |
| 8,438,643 B2 | 5/2013 | Wiemer et al. | |
| 8,494,974 B2 | 7/2013 | Watters et al. | |
| 8,595,831 B2 | 11/2013 | Skare | |
| 8,595,844 B2 | 11/2013 | Bahl | |
| 8,621,637 B2 | 12/2013 | Al-Harbi et al. | |
| 8,712,596 B2 | 4/2014 | Scott | |
| 8,726,393 B2 | 5/2014 | Macy et al. | |
| 8,763,074 B2 | 6/2014 | Bechtel et al. | |
| 8,769,412 B2 | 7/2014 | Gill et al. | |
| 8,776,168 B1 | 7/2014 | Gibson et al. | |
| 8,806,632 B2 | 8/2014 | Stefanidakis et al. | |
| 8,856,936 B2 | 10/2014 | Datta Ray et al. | |
| 9,166,999 B1 | 10/2015 | Kulkami et al. | |
| 9,373,267 B2 | 6/2016 | Sadeh-Koniecpol et al. | |
| 9,401,926 B1 | 7/2016 | Dubow et al. | |
| 9,709,636 B2* | 7/2017 | Witter | G06Q 10/06311 |
| 9,838,410 B2* | 12/2017 | Muddu | H04L 63/1425 |
| 9,934,384 B2* | 4/2018 | Johansson | G06F 21/577 |
| 10,026,049 B2* | 7/2018 | Asenjo | G06Q 10/0635 |
| 2003/0033550 A1* | 2/2003 | Kuiawa | G06F 3/04817 713/340 |
| 2003/0126472 A1 | 7/2003 | Banzhof | |
| 2003/0154393 A1 | 8/2003 | Young | |
| 2003/0158929 A1* | 8/2003 | McNerney | H04L 41/0893 709/223 |
| 2004/0030531 A1 | 2/2004 | Miller et al. | |
| 2004/0047324 A1* | 3/2004 | Diener | H04L 1/1664 370/338 |
| 2004/0193907 A1 | 9/2004 | Patanella | |
| 2005/0010821 A1 | 1/2005 | Cooper et al. | |
| 2005/0144480 A1 | 6/2005 | Kim et al. | |
| 2005/0182834 A1* | 8/2005 | Black | H04L 41/16 709/224 |
| 2005/0193430 A1 | 9/2005 | Cohen et al. | |
| 2005/0216585 A1* | 9/2005 | Todorova | H04L 41/22 709/224 |
| 2005/0283751 A1 | 12/2005 | Bassin et al. | |
| 2006/0010493 A1 | 1/2006 | Piesco et al. | |
| 2006/0080156 A1* | 4/2006 | Baughn | G06Q 10/063112 705/7.14 |
| 2006/0085852 A1 | 4/2006 | Sima | |
| 2006/0101517 A1 | 5/2006 | Banzhof et al. | |
| 2006/0117388 A1 | 6/2006 | Nelson et al. | |
| 2006/0123482 A1 | 6/2006 | Aaron | |
| 2006/0126501 A1 | 6/2006 | Ramaswamy | |
| 2006/0174121 A1 | 8/2006 | Omae et al. | |
| 2006/0206941 A1 | 9/2006 | Collins | |
| 2006/0239645 A1 | 10/2006 | Curtner et al. | |
| 2007/0067846 A1 | 3/2007 | McFarlane et al. | |
| 2007/0094491 A1 | 4/2007 | Teo et al. | |
| 2007/0143851 A1 | 6/2007 | Nicodemus et al. | |
| 2007/0223398 A1 | 9/2007 | Luo et al. | |
| 2007/0226794 A1 | 9/2007 | Howcroft et al. | |
| 2007/0289008 A1 | 12/2007 | Andreev et al. | |
| 2008/0016339 A1 | 1/2008 | Shukla | |
| 2008/0034313 A1* | 2/2008 | Hildebrand | H04L 41/16 715/772 |
| 2008/0047016 A1 | 2/2008 | Spoonamore | |
| 2008/0141377 A1 | 6/2008 | Dunagan et al. | |
| 2008/0172347 A1 | 7/2008 | Bernoth et al. | |
| 2008/0189788 A1 | 8/2008 | Bahl | |
| 2008/0209567 A1 | 8/2008 | Lockhart et al. | |
| 2008/0229420 A1 | 9/2008 | Jeschke et al. | |
| 2008/0235196 A1 | 9/2008 | Broussard et al. | |
| 2008/0262822 A1 | 10/2008 | Hardwick et al. | |
| 2009/0024663 A1 | 1/2009 | McGovern | |
| 2009/0121860 A1 | 5/2009 | Kimmel et al. | |
| 2009/0228316 A1 | 9/2009 | Foley et al. | |
| 2010/0121929 A1 | 5/2010 | Lin | |
| 2010/0125911 A1 | 5/2010 | Bhaskaran | |
| 2010/0125912 A1* | 5/2010 | Greenshpon | H04L 63/1433 726/25 |
| 2010/0242114 A1 | 9/2010 | Bunker et al. | |
| 2010/0262467 A1* | 10/2010 | Barnhill, Jr. | H04L 12/2809 709/223 |
| 2010/0318512 A1 | 12/2010 | Ludwig | |
| 2010/0324945 A1 | 12/2010 | Hessing | |
| 2011/0039237 A1* | 2/2011 | Skare | G05B 23/0267 434/118 |
| 2011/0126111 A1* | 5/2011 | Gill | G06F 21/55 715/736 |
| 2011/0162073 A1 | 6/2011 | Jeschke et al. | |
| 2011/0231412 A1 | 9/2011 | Kariv | |
| 2011/0270804 A1* | 11/2011 | Hadar | G06F 8/35 707/684 |
| 2011/0288692 A1 | 11/2011 | Scott | |
| 2012/0011077 A1 | 1/2012 | Bhagat | |
| 2012/0011590 A1* | 1/2012 | Donovan | H04L 63/1408 726/25 |
| 2012/0109834 A1 | 5/2012 | Bongiovanni et al. | |
| 2012/0180133 A1* | 7/2012 | Al-Harbi | H04L 63/1433 726/25 |
| 2012/0216243 A1* | 8/2012 | Gill | G06F 21/55 726/1 |
| 2012/0224057 A1 | 9/2012 | Gill et al. | |
| 2012/0255003 A1 | 10/2012 | Sallam | |
| 2012/0268269 A1 | 10/2012 | Doyle | |
| 2013/0031037 A1 | 1/2013 | Brandt et al. | |
| 2013/0067558 A1 | 3/2013 | Markham et al. | |
| 2013/0111275 A1 | 5/2013 | Ganesan et al. | |
| 2013/0160119 A1 | 6/2013 | Sartin et al. | |
| 2013/0174259 A1 | 7/2013 | Pearcy et al. | |
| 2013/0212685 A1 | 8/2013 | Kelley et al. | |
| 2013/0239177 A1* | 9/2013 | Sigurdson | H04L 63/102 726/4 |
| 2013/0247207 A1 | 9/2013 | Hugard et al. | |
| 2013/0283336 A1 | 10/2013 | Macy et al. | |
| 2013/0298244 A1 | 11/2013 | Kumar et al. | |
| 2013/0326002 A1 | 12/2013 | Leuoth et al. | |
| 2013/0347107 A1 | 12/2013 | Williams et al. | |
| 2014/0007244 A1 | 1/2014 | Martin et al. | |
| 2014/0082738 A1 | 3/2014 | Bahl | |
| 2014/0130121 A1 | 5/2014 | Lin | |
| 2014/0137267 A1 | 5/2014 | Keitel et al. | |
| 2014/0165128 A1 | 6/2014 | Auvenshine et al. | |
| 2014/0215555 A1 | 7/2014 | Barton et al. | |
| 2014/0236668 A1 | 8/2014 | Young et al. | |
| 2014/0283083 A1 | 9/2014 | Gula et al. | |
| 2014/0289796 A1 | 9/2014 | Moloian et al. | |
| 2014/0297495 A1* | 10/2014 | Dalal | G06Q 40/06 705/37 |
| 2014/0305525 A1 | 10/2014 | Le Moing et al. | |
| 2014/0337086 A1 | 11/2014 | Asenjo et al. | |
| 2014/0359777 A1 | 12/2014 | Lam et al. | |
| 2015/0018984 A1 | 1/2015 | Williams et al. | |
| 2015/0032839 A1 | 1/2015 | Serokurov et al. | |
| 2015/0033323 A1 | 1/2015 | Oliphant et al. | |
| 2015/0033337 A1 | 1/2015 | Baikalov et al. | |
| 2015/0163242 A1 | 6/2015 | Laidlaw et al. | |
| 2015/0213369 A1 | 7/2015 | Brandt et al. | |
| 2015/0242769 A1 | 8/2015 | Kezeu | |
| 2015/0264061 A1 | 9/2015 | Ibatullin et al. | |
| 2015/0281287 A1 | 10/2015 | Gill et al. | |
| 2015/0370983 A1 | 12/2015 | Vial et al. | |
| 2016/0011921 A1 | 1/2016 | Rao et al. | |
| 2016/0164892 A1 | 6/2016 | Satish et al. | |

(56) References Cited

U.S. PATENT DOCUMENTS

| | | | |
|---|---|---|---|
| 2016/0205126 | A1 | 7/2016 | Boyer et al. |
| 2016/0205143 | A1 | 7/2016 | Bryson et al. |
| 2016/0212165 | A1 | 7/2016 | Singla et al. |
| 2016/0217160 | A1 | 7/2016 | Croft |
| 2016/0234252 | A1* | 8/2016 | Carpenter ............... H04L 63/20 |
| 2016/0330222 | A1 | 11/2016 | Brandt et al. |
| 2016/0330291 | A1* | 11/2016 | Asenjo ................. H04L 65/403 |
| 2018/0025163 | A1* | 1/2018 | Bahl .................... H04L 63/1416 |
| 2018/0077193 | A1* | 3/2018 | Roytman .............. G06F 21/577 |
| 2018/0124114 | A1* | 5/2018 | Woods ................... H04L 63/20 |
| 2018/0356792 | A1* | 12/2018 | Chao ................ G05B 19/41835 |

FOREIGN PATENT DOCUMENTS

| | | |
|---|---|---|
| KR | 10-1060277 | 8/2011 |
| KR | 10-2014-0097691 | 8/2014 |
| WO | WO 2013/166126 A1 | 11/2013 |

OTHER PUBLICATIONS

No stated author; "Enterprise NEtwork Management iPost: Implementing Continuous Risk Monitoring at the Department of State;" May 2010; Retrieved from the Internet <URL: http://www.state.gov/documents/organization/156865.pdf>; pp. 1-28 as printed.*

No stated author; Event Viewer; 2002; Retrieved from the Internet <URL: https://web.archive.org/web/20020701180124/http://www.comptechdoc.org/os/windows/ntserverguide/ntseventlog.html>; pp. 1-1 as printed. (Year: 2002).*

Harkins; Use Excel's conditional formatting feature to display simple icons; 2011; Retrieved from the Internet <URL: https://www.techrepublic.com/blog/microsoft-office/use-excels-conditional-formatting-feature-to-display-simple-icons/>; pp. 1-11, as printed. (Year: 2011).*

Vedaraman; Host Assessment and Risk Rating; 2004; Retrieved from the Internet <URL: https://web.archive.org/web/20131203120836/https://www.sans.org/reading-room/whitepapers/bestprac/host-assessnnent-risk-rating-1460>; pp. 1-15, as printed. (Year: 2004).*

McCarthy et al.; National Institute of Standards and Technology Cybersecurity Risk Management Framework Applied to Modern Vehicles; Oct. 2014; Retrieved from the Internet <URL: https://rosap.ntl.bts.gov/view/dot/12120>; pp. 1-27, as printed. (Year: 2014).*

No stated author; Handbook for Self-Assessing Security Vulnerabilities & Risks of Industrial Control Systems on DOD Installations; 2012; Retrieved from the Internet <URL: https://www.wbdg.org/files/pdfs/ics_handbook.pdf>; pp. 1-204, as printed. (Year: 2012).*

No stated author; CySafe Cyber Security Assessment for Everyone; 2014; retrieved from the Internet <URL: https://www.g2gmarket.com/about/Documents/CySAFE_Vendor_Sample.pdf>; pp. 1-16, as printed. (Year: 2014).*

Notification of Transmittal of International Search Report and the Written Opinion of the International Searching Authority, or the Declaration dated Jun. 3, 2016 in connection with International Application No. PCT/US2016/016798, 10 pages.

Notification of Transmittal of International Search Report and the Written Opinion of the International Searching Authority, or the Declaration dated May 13, 2016 in connection with International Application No. PCT/US2016/015890, 11 pages.

Notification of Transmittal of International Search Report and the Written Opinion of the International Searching Authority, or the Declaration dated May 13, 2016 in connection with International Application No. PCT/US2016/016098, 12 page.

Notification of Transmittal of International Search Report and the Written Opinion of the International Searching Authority, or the Declaration dated Jun. 13, 2016 in connection with International Application No. PCT/US2016/016496, 12 pages.

Notification of Transmittal of International Search Report and the Written Opinion of the International Searching Authority, or the Declaration dated Jun. 3, 2016 in connection with International Application No. PCT/US2016/016399, 11 pages.

Notification of Transmittal of International Search Report and the Written Opinion of the International Searching Authority, or the Declaration dated Jun. 3, 2016 in connection with International Application No. PCT/US2016/016265, 10 pages.

Notification of Transmittal of International Search Report and the Written Opinion of the International Searching Authority, or the Declaration dated Jun. 2, 2016 in connection with International Application No. PCT/US2016/015952, 11 pages.

Notification of Transmittal of International Search Report and the Written Opinion of the International Searching Authority, or the Declaration dated May 18, 2016 in connection with International Application No. PCT/US2016/016159, 11 pages.

Gerhards, R.; "The Syslog Protocol"; Network Working Group; Adiscon GmbH; Mar. 2009; 38 pages.

Knapp, E.D.; "Security Intelligence and Analytics in Industrial Systems"; Honeywell Users Group Europe, Middle East and Africa; 2014; 29 pages.

Koelemij, E.D.; "Effective Defense in Depth Strategies for Industrial Control Systems"; Honeywell Users Group Europe, Middle East and Africa; 2014; 21 pages.

Koelemij, S.; "Designing a Secure Industrial Control System"; Honeywell Users Group EMEA; Industrial IT Solutions: 2013; 11 pages.

Koelemij, S.; "Making Cyber Security S.M.A.R.T."; Honeywell Industrial Cyber Security; EMEA HUG Training Session; 2014; 63 pages.

Ricks, B.; "System Center 2012 R2 Operations Manager Documentation"; Microsoft System Center 2012 R2; Microsoft Corp; Nov. 1, 2013; 1389 pages.

Spear, M.; "Industrial Cyber Security 101"; Honeywell Users Group Europe, Middle East and Africa; 2015; 25 pages.

"Certification Testing Specification"; OPC Foundation; Release Candidate 1.02; May 28, 2014; 20 pages.

"Guide for Conducting Risk Assessments—Information Security"; NIST Special Publication 800-30, Revision 1; NIST, U.S. Dept of Commerce; Sep. 2012; 95 pages.

"Honeywell Industrial Cyber Security Overview and Managed Industrial Cyber Security Services"; HPS; Jun. 4, 2014; 19 pages.

"Information Technology—Security Techniques—Information Security Risk Management"; Bio Standards Publication; BS ISO/IEC 27005;2011; 80 pages.

"Risk Management and Critical Infrastructure Protection: Assessing, Integrating, and Managing Threats, Vulnerabilities and Consequences"; CRS Rpt for Congress; RL32561; Feb. 4, 2005; 28 pages.

"Security for Industrial Automation and Control Systems Part 2-3: Patch Management in the IACS Environment"; ISA-TR62443-2-3-2015; Jul. 1, 2015; 18 pages.

"Design and Planning Guide for System Center 2012—Operations Manager"; System Center 2012; Microsoft Corporation; Apr. 2012; 13 pages.

Hutzler, D., "How to Prevent Attacks on Air Gapped Networks," OPSWAT Blog, https://www.opswat.com/blog/how-prevent-attacks-air-gapped-networks, Jan. 16, 2015, 5 pages.

Marshall, R., "Guest Post: How to Configure Alerts in System Center 2012," https://blogs.technet.microsoft.com/uktechnet/2013/04/08/guest-post-how-to-configure-alerts-in-system-center-2012/, Apr. 8, 2013, 9 pages.

"Configuring Symantec Vulnerability Assessment 1.0 for Network Audits," TECH111985, https://support.symantec.com/en_US/article.TECH111985.html, Jan. 16, 2003, 6 pages.

U.S. Appl. No. 14/871,695, Non-Final Office Action dated Dec. 16 2016, 11 pages.

U.S. Appl. No. 14/871,521, Non-Final Office Action dated Dec. 19, 2016, 11 pages.

U.S. Appl. No. 14/871,855, Non-Final Office Action dated Jan. 18, 2017, 12 pages.

U.S. Appl. No. 14/871,732, Non-Final Office Action dated Dec. 30, 2016, 36 pages.

U.S. Appl. No. 14/871,503, Non-Final Office Action dated Dec. 28, 2016, 11 pages.

U.S. Appl. No. 14/871,547, Non-Final Office Action dated Dec. 16, 2016, 12 pages.

(56) References Cited

OTHER PUBLICATIONS

U.S. Appl. No. 14/871,605, Non-Final Office Action dated Dec. 19, 2016, 13 pages.
U.S. Appl. No. 14/871,814, Non-Final Office Action dated Dec. 16, 2016, 7 pages.
U.S. Appl. No. 14/705,379, Non-Final Office Action dated Feb. 7, 2017, 7 pages.
Foreign Communication From a Related Counterpart Application, PCT Application No. PCT/US2016/028553, International Search Report and Written Opinion dated Apr. 21, 2016, 10 pages.

* cited by examiner

APPARATUS AND METHOD FOR TYING CYBER-SECURITY RISK ANALYSIS TO COMMON RISK METHODOLOGIES AND RISK LEVELS

CROSS-REFERENCE TO RELATED APPLICATION

This application claims the benefit of the filing date of U.S. Provisional Patent Application 62/114,937, filed Feb. 11, 2015, which is hereby incorporated by reference.

TECHNICAL FIELD

This disclosure relates generally to network security. More specifically, this disclosure relates to an apparatus and method for tying cyber-security risk analysis to common risk methodologies and risk levels.

BACKGROUND

Processing facilities are often managed using industrial process control and automation systems. Conventional control and automation systems routinely include a variety of networked devices, such as servers, workstations, switches, routers, firewalls, safety systems, proprietary real-time controllers, and industrial field devices. Often times, this equipment comes from a number of different vendors. In industrial environments, cyber-security is of increasing concern, and unaddressed security vulnerabilities in any of these components could be exploited by attackers to disrupt operations or cause unsafe conditions in an industrial facility.

SUMMARY

This disclosure provides apparatuses and methods for tying cyber-security risk analysis to common risk methodologies and risk levels. One embodiment includes a method that includes obtaining a first threshold value and a second threshold value associated with cyber-security risks to computing devices in an industrial process control and automation system. The method includes generating a first type of notification when a risk value associated with a specified cyber-security risk exceeds the first threshold value but not the second threshold value. The method includes generating a second type of notification when the risk value associated with the specified cyber-security risk exceeds the first and second threshold values, the second type of notification having a higher priority than the first type of notification.

Another disclosed method, and corresponding systems and machine-readable media, include identifying a plurality of connected devices, by a risk manager system, that are vulnerable to cyber-security risks. The method includes identifying, by the risk manager system, cyber-security risks in the connected devices. The method includes assigning, by the risk manager system, a risk level to each of the identified cyber-security risks. The method includes, for each identified cyber-security risk, comparing by the risk manager system the assigned risk level to a first threshold and to a second threshold. The method includes based on the comparisons, assigning each identified cyber-security risk to a risk classification by the risk manager system. The method includes displaying, by the risk manager system, a user interface that includes a notification according to the identified cyber-security risks and the corresponding assigned risk classifications. In various embodiments, the first threshold is a risk appetite and the second threshold is a risk tolerance. In various embodiments, the risk manager system also receives the first and second threshold from a user. In various embodiments, the risk manager system assigns identified cyber-security risks with an assigned risk level that is less than both the first threshold and the second threshold to a low-priority classification or a notification classification. In various embodiments, the risk manager system assigns identified cyber-security risks with an assigned risk level that is greater than or equal to the first threshold bus is less than the second threshold to a warning classification. In various embodiments, the risk manager system assigns identified cyber-security risks with an assigned risk level that is greater than or equal to both the first threshold and the second threshold to an alert classification. In various embodiments, the risk manager system prompts a user for an action in response to displaying the notification.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
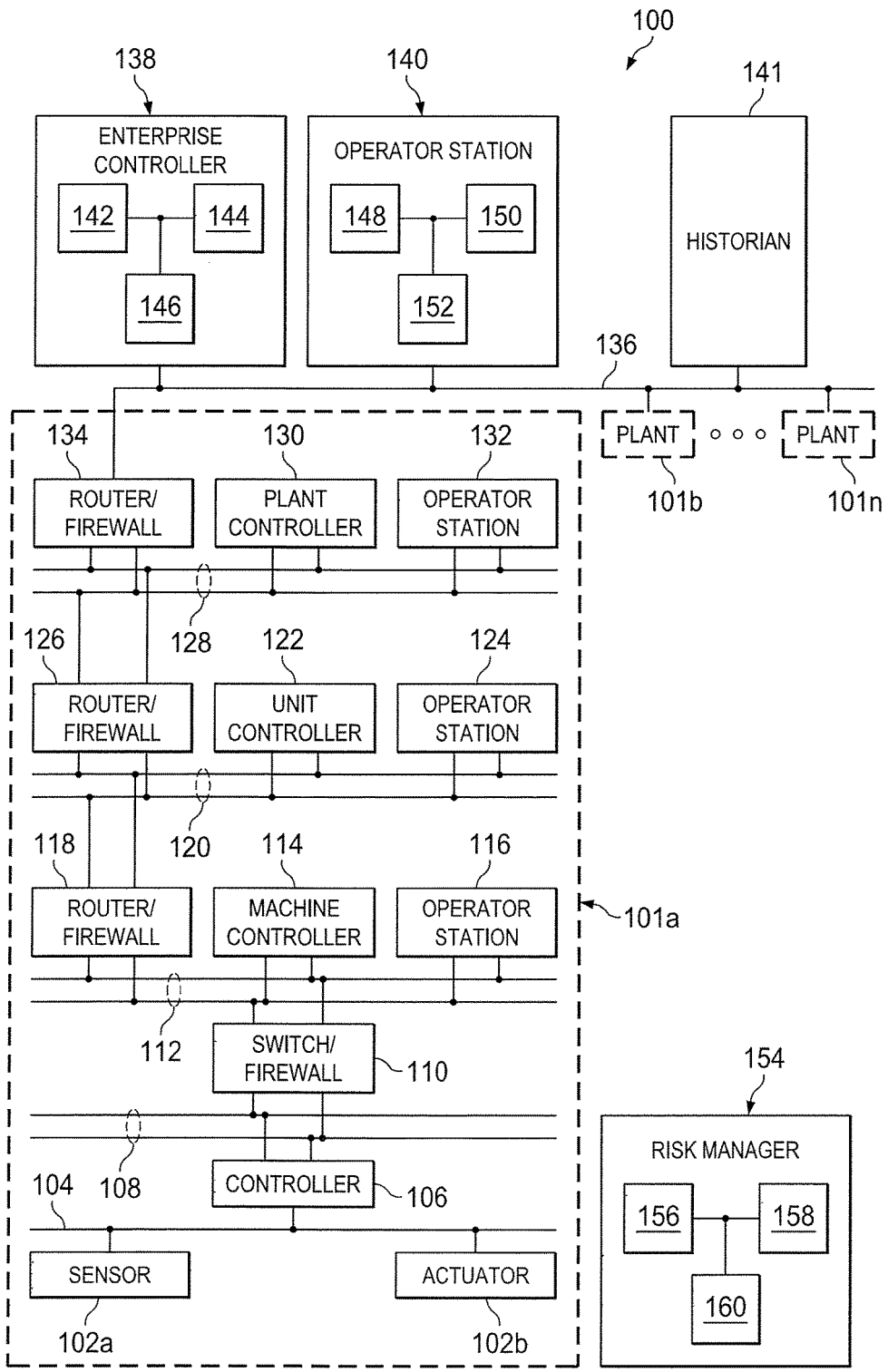
FIG. 1 illustrates an example industrial process control and automation system according to this disclosure

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate.

Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing 30o applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 106, 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers.

As noted above, cyber-security is of increasing concern with respect to industrial process control and automation systems. Unaddressed security vulnerabilities in any of the components in the system 100 could be exploited by attackers to disrupt operations or cause unsafe conditions in an industrial facility. However, in many instances, operators do not have a complete understanding or inventory of all equipment running at a particular industrial site. As a result, it is often difficult to quickly determine potential sources of risk to a control and automation system.

This disclosure recognizes a need for a solution that understands potential vulnerabilities in various systems, prioritizes the vulnerabilities based on risk to an overall system, and guides a user to mitigate the vulnerabilities. Moreover, a quantification of "cyber-security risk" has little value unless it both aligns with established organizational risk policies and aligns with recognized risk methodologies and standards. In other words, additional context for a risk score is often needed in order to effectively portray what a risk means to an organization.

This is accomplished (among other ways) using a risk manager 154. Among other things, the risk manager 154 supports a technique for tying risk analysis to common risk methodologies and risk levels. The risk manager 154 includes any suitable structure that supports automatic handling of cyber-security risk events. Here, the risk manager 154 includes one or more processing devices 156; one or more memories 158 for storing instructions and data used, generated, or collected by the processing device(s) 156; and at least one network interface 160. Each processing device 156 could represent a microprocessor, microcontroller, digital signal process, field programmable gate array, application specific integrated circuit, or discrete logic. Each memory 158 could represent a volatile or non-volatile storage and retrieval device, such as a random access memory or Flash memory. Each network interface 160 could represent an Ethernet interface, wireless transceiver, or other device facilitating external communication. The functionality of the risk manager 154 could be implemented using any suitable hardware or a combination of hardware and software/firmware instructions.

In some embodiments, how risk matters to an organization is determined through the use of two threshold values: risk appetite and risk tolerance. These thresholds dictate when an organization is capable of absorbing risk and when action needs to be taken. For example, if below an organization's risk appetite, a risk is acceptable. If above the risk appetite, the risk should be addressed. The risk tolerance is a higher threshold that determines when a risk has become dangerously high; action should still be taken but now with increased urgency.

Within the risk manager 154, risk appetite and risk tolerance can denote user-configurable parameters that are used as the thresholds for risk item notifications, and these can be defined for each type or classification of risk. In some embodiments, the values of risk appetite and risk tolerance are used as threshold points for alarming and notification. When below the risk appetite, items are of low priority. When above the risk appetite but below the risk tolerance, the items become warnings. Above the risk tolerance, the items become alerts.

Although FIG. 1 illustrates one example of an industrial process control and automation system 100, various changes may be made to FIG. 1. For example, a control and automation system could include any number of sensors, actuators, controllers, servers, operator stations, networks, risk managers, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which the functions of the risk manager 154 can be used. This functionality can be used in any other suitable device or system.

Figure 2:
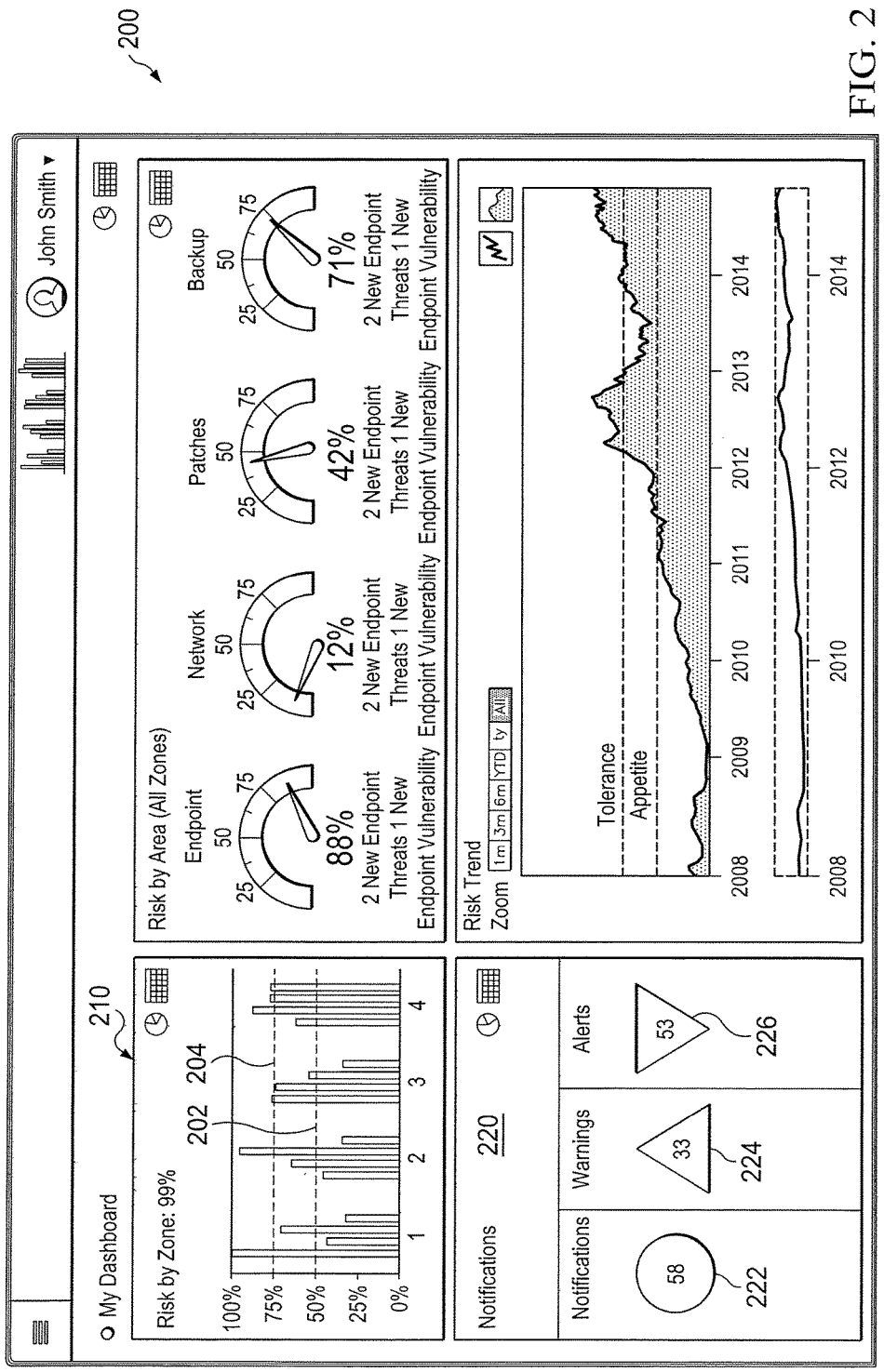
FIG. 2 illustrates an example graphical user interface for tying risk analysis to common risk methodologies and risk levels according to this disclosure.

FIG. 2 illustrates an example graphical user interface 200 for tying risk analysis to common risk methodologies and risk levels according to this disclosure. In this user interface 200, different colors or other indicators could be used to represent these different conditions. For example, blue can represent risk items with risk values below the risk appetite, yellow can represent risk items with risk values above the risk appetite and below the risk tolerance, and red can represent risk items with risk values above the risk tolerance. The graphical user interface 200 also includes various summaries that identify different types of notifications by zone, by area, and by notification type, as well as a risk trend summary.

This figure illustrates a risk appetite 202 (also referred to herein as the first threshold) and a risk tolerance 204 (also referred to herein as a second threshold) in a "risk by zone" area 210. As shown in this example, some risks in particular zones are below the risk appetite 202, and so indicate a low priority. Some risks in particular zones are above the risk appetite 202 but below the risk tolerance 204, and so indicate a warning. Some risks in particular zones are above both the risk appetite 202 and the risk tolerance 204, and so indicate an alert.

FIG. 2 also illustrates a notification area 220. The risk appetite and risk threshold values can be utilized to trigger notifications, warnings, and alerts. For example, low-priority items below the risk appetite 202 may require no action but could result in a general notification 222. In this example, general notification 222 is displayed as a circle, and can be in a particular color, such as blue. Items above the risk appetite but below the risk tolerance may require action and therefore trigger a warning notification and prompt a user for action. In this example, warning 224 is displayed as a triangle, and can be in a particular color, such as orange. Above the risk tolerance can trigger an alert notification with a higher urgency and priority. In this example, warning 226 is displayed as an inverted triangle, and can be in a particular color, such as red. Each of these indicators can display the number of notifications, warnings, or alerts that have been detected. Of course, in different implementations, different shapes or colors may be used according to the user or designer's preference. In various embodiments, the system can receive a user input such as a selection of one of the notifications and, in response, will display details of the corresponding notifications, warnings, or alerts.

The configuration of the risk appetite and risk tolerance thresholds may preclude the need to alter the consistent elements of risk quantification (vulnerability and threat). It also adds an organization-specific context that determines what a risk score means, rather than trying to change the risk score itself. The risk tolerance threshold can also be adjusted in response to an observed threat level. For instance, during a period of a cyber-incident or relevant disclosure, the overall threat level to an organization is higher, there may be less tolerance to risk, and the risk tolerance threshold can be lowered accordingly.

Although FIG. 2 illustrates one example of a graphical user interface 200 for tying risk analysis to common risk methodologies and risk levels, various changes may be made to FIG. 2. For example, the content and arrangement of the graphical user interface 200 are for illustration only. Different gauges, charts, or other indicators could be used to identify items related to cyber-security.

Figure 3:
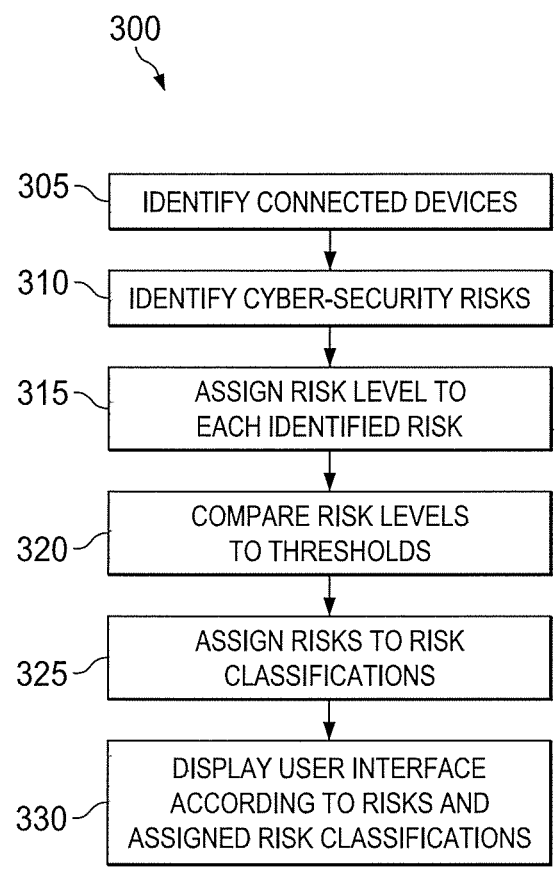
FIG. 3 illustrates a flowchart of a process in accordance with disclosed embodiments.

FIG. 3 illustrates a flowchart of a method 300 in accordance with disclosed embodiments, as can be performed, for example, by risk manager 154 or other device or controller (referred to as the "system" below).

The system identifies a plurality of connected devices that are vulnerable to cyber-security risks (305). These could be any of the devices or components as illustrated in FIG. 1, or others. The devices can each be associated with a zone of a system such as system 100.

The system identifies cyber-security risks in the connected devices (310).

The system assigns a risk level (also referred to as a risk value or risk assessment value) to each of the identified cyber-security risks (315).

For each identified cyber-security risk, the system compares the assigned risk level to a first threshold and to a second threshold (320). The first threshold can be a risk appetite and the second threshold can be a risk tolerance. The first threshold and second threshold can be threshold values associated with cyber-security risks to computing devices in an industrial process control and automation system. The system can also obtain or receive the first and second threshold, such as by receiving them from a user.

Based on the comparisons, the system assigns each identified cyber-security risk to a risk classification (325). This can include assigning identified cyber-security risks with an assigned risk level that is less than both the first threshold and the second threshold to a low-priority classification or a notification classification. This can include assigning identified cyber-security risks with an assigned risk level that is greater than or equal to the first threshold bus is less than the second threshold to a warning classification. This can include assigning identified cyber-security risks with an assigned risk level that is greater than or equal to both the first threshold and the second threshold to an alert classification. Of course, this example of the comparison assumes that a higher risk level means a more severe risk, and other embodiments could use an opposite notation so that values lower than the thresholds indicate a more severe or alert-level risk.

The system stores these and displays, to a user, a user interface that includes a notification according to the identified cyber-security risks and the corresponding assigned risk classifications (330). The notification can include, either by default or in response to an input from a user, details of each of the identified cyber-security risks. The notification can include graphical symbols or colors to identify the assigned risk classifications. The notification can include a total number of identified cyber-security risks assigned to each classification. The system can prompt a user for an action in response to displaying the notification. The system can therefore generate a first type of notification when a risk level or value associated with a specified cyber-security risk exceeds the first threshold but not the second threshold, and can generate a second type of notification when the risk level or value associated with the specified cyber-security risk exceeds both the first and second threshold values, where the second type of notification has a higher priority than the first type of notification.

Note that the risk manager 154 and/or the graphical user interface 200 could use or operate in conjunction with any combination or all of various features described in the following previously-filed and concurrently-filed patent applications (all of which are hereby incorporated by reference):

U.S. patent application Ser. No. 14/482,888 entitled "DYNAMIC QUANTIFICATION OF CYBER-SECURITY RISKS IN A CONTROL SYSTEM";

U.S. Provisional Patent Application No. 62/036,920 entitled "ANALYZING CYBER-SECURITY RISKS IN AN INDUSTRIAL CONTROL ENVIRONMENT";

U.S. Provisional Patent Application No. 62/113,075 entitled "RULES ENGINE FOR CONVERTING SYSTEM-RELATED CHARACTERISTICS AND EVENTS INTO CYBER-SECURITY RISK ASSESSMENT VALUES" and corresponding non-provisional U.S. patent application Ser. No. 14/871,695 of like title filed concurrently herewith;

U.S. Provisional Patent Application No. 62/113,221 entitled "NOTIFICATION SUBSYSTEM FOR GENERATING CONSOLIDATED, FILTERED, AND RELEVANT SECURITY RISK-BASED NOTIFICATIONS" and corresponding non-provisional U.S. patent application Ser. No. 14/871,521 of like title filed concurrently herewith;

U.S. Provisional Patent Application No. 62/113,100 entitled "TECHNIQUE FOR USING INFRASTRUCTURE MONITORING SOFTWARE TO COLLECT CYBER-SECURITY RISK DATA" and corresponding non-provisional U.S. patent application Ser. No. 14/871,855 of like title filed concurrently herewith;

U.S. Provisional Patent Application No. 62/113,186 entitled "INFRASTRUCTURE MONITORING TOOL FOR COLLECTING INDUSTRIAL PROCESS CONTROL AND AUTOMATION SYSTEM RISK DATA" and corresponding non-provisional U.S. patent application Ser. No. 14/871,732 of like title filed concurrently herewith;

U.S. Provisional Patent Application No. 62/113,165 entitled "PATCH MONITORING AND ANALYSIS" and corresponding non-provisional U.S. patent application Ser. No. 14/871,921 of like title filed concurrently herewith;

U.S. Provisional Patent Application No. 62/113,152 entitled "APPARATUS AND METHOD FOR AUTOMATIC HANDLING OF CYBER-SECURITY RISK EVENTS" and corresponding non-provisional U.S. patent application Ser. No. 14/871,503 of like title filed concurrently herewith;

U.S. Provisional Patent Application No. 62/114,928 entitled "APPARATUS AND METHOD FOR DYNAMIC CUSTOMIZATION OF CYBER-SECURITY RISK ITEM RULES" and corresponding non-provisional U.S. patent application Ser. No. 15/988,184 of like title filed concurrently herewith;

U.S. Provisional Patent Application No. 62/114,865 entitled "APPARATUS AND METHOD FOR PROVIDING POSSIBLE CAUSES, RECOMMENDED ACTIONS, AND POTENTIAL IMPACTS RELATED TO IDENTIFIED CYBER-SECURITY RISK ITEMS" and corresponding non-provisional U.S. patent application Ser. No. 14/871,814 of like title filed concurrently herewith; and U.S. Provisional Patent Application No. 62/116,245 entitled "RISK MANAGEMENT IN AN AIR-GAPPED ENVIRONMENT" and corresponding non-provisional U.S. patent application Ser. No. 14/871,547 of like title filed concurrently herewith.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method to provide an action based on cyber-security risk classifications in an industrial process control and automation system comprising:
   identifying, by a risk manager system, a plurality of connected devices within the industrial process control and automation system that are vulnerable to cyber-security risks;
   identifying, by the risk manager system, cyber-security risks in the connected devices;
   assigning, by the risk manager system, a risk level to each of the identified cyber-security risks;
   for each identified cyber-security risk, comparing by the risk manager system the assigned risk level to a first threshold and to a second threshold based on respective risk zones of the industrial process control and automation system, the first and second thresholds associated with the cyber-security risks in the connected devices, wherein the risks could result in unsafe conditions in the industrial process control and automation system;
   based on the comparisons, assigning, by the risk manager system, each identified cyber-security risk to a risk classification;
   displaying, by the risk manager system, a user interface that includes a plurality of notifications according to the identified cyber-security risks and the corresponding assigned risk classifications, the plurality of notifications comprising a general notification including a first shape displayed in a first color, a warning notification including a second shape displayed in a second color, and an alert notification including a third shape displayed in a third color, each of the plurality of notifications comprising a display of a number of the identified cyber-security risks for a corresponding one of the assigned risk classifications; and
   providing, by the risk manager system, an action based on the displaying of the plurality of notifications to the user.

2. The method of claim 1, wherein the first threshold is a risk appetite and the second threshold is a risk tolerance.

3. The method of claim 1, further comprising receiving, by the risk manager system, the first and second thresholds from a user.

4. The method of claim 1, further comprising assigning, by the risk manager system, identified cyber-security risks with an assigned risk level that is less than both the first threshold and the second threshold to a low-priority classification or a notification classification.

5. The method of claim 1, further comprising assigning, by the risk manager system, identified cyber-security risks with an assigned risk level that is greater than or equal to the first threshold but that is less than the second threshold to a warning classification.

6. The method of claim 1, further comprising assigning, by the risk manager system, identified cyber-security risks with an assigned risk level that is greater than or equal to both the first threshold and the second threshold to an alert classification.

7. The method of claim 1, wherein the connected devices include at least one actuator or at least one sensor.

8. A risk manager system to provide an action based on cyber-security risk classifications in an industrial process control and automation system comprising:
   a controller; and
   a display;
   wherein the controller is configured to:
      identify a plurality of connected devices within the industrial process control and automation system that are vulnerable to cyber-security risks;
      identify cyber-security risks in the connected devices;
      assign a risk level to each of the identified cyber-security risks;
      for each identified cyber-security risk, compare the assigned risk level to a first threshold and to a second threshold based on respective risk zones of the industrial process control and automation system, the first and second thresholds associated with the cyber-security risks in the connected devices, wherein the risks could result in unsafe conditions in the industrial process control and automation system;
      based on the comparisons, assign each identified cyber-security risk to a risk classification;
      present, on the display, a user interface that includes a plurality of notifications according to the identified cyber-security risks and the corresponding assigned risk classifications, the plurality of notifications comprising a general notification including a first shape displayed in a first color, a warning notification including a second shape displayed in a second color, and an alert notification including a third shape displayed in a third color, each of the plurality of notifications comprising a display of a number of the identified cyber-security risks for a corresponding one of the assigned risk classifications; and
      provide an action based on the presenting of the plurality of notifications to the user.

9. The risk manager system of claim 8, wherein the first threshold is a risk appetite and the second threshold is a risk tolerance.

10. The risk manager system of claim 8, wherein the controller is further configured to receive the first and second thresholds from a user.

11. The risk manager system of claim 8, wherein the controller is further configured to assign identified cyber-security risks with an assigned risk level that is less than both the first threshold and the second threshold to a low-priority classification or a notification classification.

12. The risk manager system of claim 8, wherein the controller is further configured to assign identified cyber-security risks with an assigned risk level that is greater than or equal to the first threshold but that is less than the second threshold to a warning classification.

13. The risk manager system of claim 8, wherein the controller is further configured to assign identified cyber-security risks with an assigned risk level that is greater than or equal to both the first threshold and the second threshold to an alert classification.

14. A non-transitory machine-readable medium encoded with executable instructions to provide an action based on cyber-security risk classifications in an industrial process control and automation system that, when executed, cause one or more processors of a risk manager system to:
   identify a plurality of connected devices within the industrial process control and automation system that are vulnerable to cyber-security risks;
   identify cyber-security risks in the connected devices;
   assign a risk level to each of the identified cyber-security risks;
   for each identified cyber-security risk, compare the assigned risk level to a first threshold and to a second threshold based on respective risk zones of the industrial process control and automation system, the first and second thresholds associated with the cyber-security risks in the connected devices, wherein the risks could result in unsafe conditions in the industrial process control and automation system;
   based on the comparisons, assign each identified cyber-security risk to a risk classification;
   initiate presentation of a user interface that includes a plurality of notifications according to the identified cyber-security risks and the corresponding assigned risk classifications, the plurality of notifications comprising a general notification including a first shape displayed in a first color, a warning notification including a second shape displayed in a second color, and an alert notification including a third shape displayed in a third color, each of the plurality of notifications comprising a display of a number of the identified cyber-security risks for a corresponding one of the assigned risk classifications; and
   provide an action based on the presentation of the plurality of notifications to the user.

15. The non-transitory machine-readable medium of claim 14, wherein
   the first threshold is a risk appetite and the second threshold is a risk tolerance.

16. The non-transitory machine-readable medium of claim 14, wherein the executable instructions, when executed, further cause the one or more processors of the risk manager system to receive the first and second thresholds from a user.

17. The non-transitory machine-readable medium of claim 14, wherein the executable instructions, when executed, further cause the one or more processors of the risk manager system to assign identified cyber-security risks with an assigned risk level that is less than both the first threshold and the second threshold to a low-priority classification or a notification classification.

18. The non-transitory machine-readable medium of claim 14, wherein the executable instructions, when executed, further cause the one or more processors of the risk manager system to assign identified cyber-security risks with an assigned risk level that is greater than or equal to the first threshold but that is less than the second threshold to a warning classification.

19. The non-transitory machine-readable medium of claim 14, wherein the executable instructions, when executed, further cause the one or more processors of the risk manager system to assign identified cyber-security risks with an assigned risk level that is greater than or equal to both the first threshold and the second threshold to an alert classification.

* * * * *